(12) United States Patent
Wiepen et al.

(10) Patent No.: US 11,433,795 B2
(45) Date of Patent: Sep. 6, 2022

(54) DEPLOYABLE TABLE FOR VEHICLE INTERIOR

(71) Applicant: Inteva Products, LLC, Troy, MI (US)

(72) Inventors: Stefan Wiepen, Schwerte (DE); Niklas Kock, Sprockhovel (DE)

(73) Assignee: INTEVA PRODUCTS, LLC, Troy, MI (US)

( * ) Notice: Subject to any disclaimer, the term of this patent is extended or adjusted under 35 U.S.C. 154(b) by 0 days.

(21) Appl. No.: 17/261,097

(22) PCT Filed: Jul. 15, 2019

(86) PCT No.: PCT/US2019/041808
§ 371 (c)(1),
(2) Date: Jan. 18, 2021

(87) PCT Pub. No.: WO2020/018423
PCT Pub. Date: Jan. 23, 2020

(65) Prior Publication Data
US 2021/0253009 A1 Aug. 19, 2021

Related U.S. Application Data

(60) Provisional application No. 62/699,905, filed on Jul. 18, 2018.

(51) Int. Cl.
*B60N 3/00* (2006.01)

(52) U.S. Cl.
CPC .................. *B60N 3/002* (2013.01)

(58) Field of Classification Search
CPC .. A47C 7/324; A47C 7/68; A47C 7/70; A47C 7/705; A47B 31/06; A47B 85/04; B60N 3/002; B60N 3/001
(Continued)

(56) References Cited

U.S. PATENT DOCUMENTS 1,201,907 A * 10/1916 Wordy ...................... A47C 7/70
297/145
3,583,760 A * 6/1971 McGregor ............. A47B 5/006
297/145
(Continued)

FOREIGN PATENT DOCUMENTS

CN 106671844 A 5/2017
CN 106696797 A 5/2017
(Continued)

OTHER PUBLICATIONS

International Preliminary Report on Patentability for Application No. PCT/US2019/041808.
(Continued)

*Primary Examiner* — Jose V Chen
(74) *Attorney, Agent, or Firm* — Cantor Colburn LLP

(57) ABSTRACT

An apparatus for deploying a table from a housing is disclosed. The apparatus including: an arm pivotally securing the table to the apparatus wherein the apparatus via the arm moves the table from a first position in a first linear direction; a deviating point that contacts the arm and pivots the table about a first axis when the arm contacts the deviating point; and an arm member slidably secured to the table at one end and pivotally secured to the arm at another end, wherein the arm member is pivotally secured to the arm and wherein pivotal movement of the table and the arm member with respect to the arm is prevented when the table extends over a pivot axis between the arm and the arm member.

14 Claims, 15 Drawing Sheets

(58) Field of Classification Search
USPC .......................... 108/44; 297/145, 127, 128
See application file for complete search history.

(56) References Cited

U.S. PATENT DOCUMENTS

| | | | | |
|---|---|---|---|---|
| 3,632,161 | A * | 1/1972 | Arfaras | A47C 7/70 297/145 |
| 4,834,449 | A * | 5/1989 | Engelman | A61G 5/10 297/145 |
| 4,944,552 | A | 7/1990 | Harris | |
| 5,547,247 | A * | 8/1996 | Dixon | A47C 7/70 297/145 |
| 5,701,826 | A * | 12/1997 | Dodgen | A47B 31/06 108/139 |
| 6,565,137 | B1 | 5/2003 | Snook et al. | |
| 7,506,923 | B1 * | 3/2009 | Gauss | B60N 3/002 297/149 |
| 7,874,614 | B2 * | 1/2011 | Figueras Mitjans | A47C 7/70 297/145 |
| 7,963,231 | B2 * | 6/2011 | Osborne | B64D 11/0638 108/40 |
| 8,171,862 | B2 * | 5/2012 | Muirhead | B60N 3/002 108/44 |
| 8,267,472 | B2 * | 9/2012 | Large | B60N 3/002 297/217.3 |
| 8,336,956 | B2 * | 12/2012 | Westerink | B60N 3/001 297/145 |
| 8,359,982 | B2 * | 1/2013 | Lebel | A47B 23/043 108/44 |
| 8,596,206 | B2 * | 12/2013 | Legeay | B64D 11/0604 108/50.11 |
| 9,783,303 | B2 * | 10/2017 | Gagnon | B64D 11/06 |
| 9,955,779 | B2 | 5/2018 | Hoeftberger et al. | |
| 2006/0220425 | A1 * | 10/2006 | Becker | B60N 3/002 297/188.16 |
| 2008/0164729 | A1 * | 7/2008 | Cavanaugh | A47C 7/624 297/162 |
| 2008/0250983 | A1 | 10/2008 | Sundarrao | |
| 2009/0255445 | A1 * | 10/2009 | Bless | B60R 9/00 108/44 |
| 2010/0275821 | A1 | 11/2010 | Lebel et al. | |
| 2010/0319588 | A1 * | 12/2010 | Hanna | B64D 11/0638 108/20 |
| 2012/0306241 | A1 * | 12/2012 | Winter | B60N 3/002 297/163 |
| 2012/0312198 | A1 * | 12/2012 | Henderson | B64D 11/0638 108/44 |
| 2014/0123930 | A1 | 5/2014 | Lineton et al. | |
| 2015/0321592 | A1 * | 11/2015 | De Morais | A47B 5/006 297/147 |
| 2016/0272098 | A1 | 9/2016 | Barnes | |
| 2016/0375810 | A1 * | 12/2016 | Kong | B60N 2/793 297/145 |
| 2017/0369173 | A1 | 12/2017 | Lee et al. | |
| 2020/0113335 | A1 * | 4/2020 | Liu | A47C 7/624 |
| 2021/0101683 | A1 * | 4/2021 | Williamson | B64D 11/0638 |
| 2021/0331804 | A1 * | 10/2021 | Frost | B64D 11/0644 |

FOREIGN PATENT DOCUMENTS

| | | |
|---|---|---|
| CN | 107284314 A | 10/2017 |
| CN | 107298043 A | 10/2017 |
| CN | 107415791 A | 12/2017 |
| CN | 106004605 B | 4/2018 |
| DE | 102011119549 A1 | 5/2013 |
| GB | 2541660 A | 3/2017 |
| JP | 2015217781 A | 12/2015 |
| RU | 2004121086 A | 1/2006 |
| RU | 2271732 C1 | 3/2006 |
| WO | 2018006748 A1 | 1/2018 |

OTHER PUBLICATIONS

International Search Report for Application No. PCT/US2019/041808; dated Oct. 17, 2019.
Written Opion for Application No. PCT/US2019/041808; dated Oct. 17, 2019.
First Chinese Office Action for Chinese Application No. 201980047085.X dated Jun. 29, 2022; 8 Pages.

* cited by examiner

DEPLOYABLE TABLE FOR VEHICLE INTERIOR

CROSS REFERENCE TO RELATED APPLICATIONS

This application is a National Stage of PCT Application No. PCT/US2019/041808 filed on Jul. 15, 2019, which claims the benefit of U.S. Provisional Patent Application No. 62/699,905 filed on Jul. 18, 2018, the entire contents each of which are incorporated herein by reference thereto.

BACKGROUND

Exemplary embodiments of the present disclosure pertain to the art of interior automotive trim in combination with a deployable table.

Vehicle interiors are constantly being improved to provide comfortable surroundings to the vehicle occupants.

Accordingly, it is desirable to provide an improvement to the interior trim of the vehicle.

BRIEF DESCRIPTION

Disclosed herein is an apparatus for deploying a table from a housing is disclosed. The apparatus including: an arm pivotally securing the table to the apparatus wherein the apparatus via the arm moves the table from a first position in a first linear direction; a deviating point that contacts the arm and pivots the table about a first axis when the arm contacts the deviating point; and an arm member slidably secured to the table at one end and pivotally secured to the arm at another end, wherein the arm member is pivotally secured to the arm and wherein pivotal movement of the table and the arm member with respect to the arm is prevented when the table extends over a pivot axis between the arm and the arm member.

In addition to one or more of the features described above, or as an alternative to any of the foregoing embodiments, the apparatus includes a motor for moving the table via the arm.

In addition to one or more of the features described above, or as an alternative to any of the foregoing embodiments, the apparatus includes a spindle operably coupled to the motor and a nut rotatably secured to the spindle such that rotation of the spindle causes linear movement of the nut.

In addition to one or more of the features described above, or as an alternative to any of the foregoing embodiments, the apparatus includes a rail slidably receiving a sliding element, wherein the sliding element is operably coupled to the nut.

In addition to one or more of the features described above, or as an alternative to any of the foregoing embodiments, wherein the table includes a foldable lip.

In addition to one or more of the features described above, or as an alternative to any of the foregoing embodiments, the table is pivotally secured to the arm member for movement about another axis, the another axis being different from the pivot axis.

In addition to one or more of the features described above, or as an alternative to any of the foregoing embodiments, the table and the arm member are pivotally secured to the arm for movement about another axis, the another axis being different from the pivot axis.

Also disclosed is an interior trim of a vehicle. The interior trim having: a housing; and an apparatus for deploying a table from the housing, the apparatus including: an arm pivotally securing the table to the apparatus wherein the apparatus via the arm moves the table from a first position in a first linear direction; a deviating point that contacts the arm and pivots the table about a first axis when the arm contacts the deviating point; and an arm member slidably secured to the table at one end and pivotally secured to the arm at another end, wherein the arm member is pivotally secured to the arm and wherein pivotal movement of the table and the arm member with respect to the arm is prevented when the table extends over a pivot axis between the arm and the arm member.

In addition to one or more of the features described above, or as an alternative to any of the foregoing embodiments, the apparatus includes a motor for moving the table via the arm.

In addition to one or more of the features described above, or as an alternative to any of the foregoing embodiments, the apparatus includes a spindle operably coupled to the motor and a nut rotatably secured to the spindle such that rotation of the spindle causes linear movement of the nut.

In addition to one or more of the features described above, or as an alternative to any of the foregoing embodiments, the apparatus includes a rail slidably receiving a sliding element, wherein the sliding element is operably coupled to the nut.

In addition to one or more of the features described above, or as an alternative to any of the foregoing embodiments, the table includes a foldable lip.

In addition to one or more of the features described above, or as an alternative to any of the foregoing embodiments, the table is pivotally secured to the arm member for movement about another axis, the another axis being different from the pivot axis.

In addition to one or more of the features described above, or as an alternative to any of the foregoing embodiments, the table and the arm member are pivotally secured to the arm for movement about another axis, the another axis being different from the pivot axis.

In addition to one or more of the features described above, or as an alternative to any of the foregoing embodiments, the housing has a deployable door that opens when a button operably coupled to the apparatus is actuated.

In addition to one or more of the features described above, or as an alternative to any of the foregoing embodiments, the housing is a center console of the vehicle.

In addition to one or more of the features described above, or as an alternative to any of the foregoing embodiments, the center console encloses another apparatus for deploying another table from the center console, the another apparatus including: an arm pivotally securing the another table to the another apparatus wherein the apparatus via the arm moves the another table from a first position in a first linear direction; a deviating point that contacts the arm and pivots the another table about a first axis when the arm contacts the deviating point; and an arm member slidably secured to the another table at one end and pivotally secured to the arm at another end, wherein the arm member is pivotally secured to the arm and wherein pivotal movement of the another table and the arm member with respect to the arm is prevented when the another table extends over a pivot axis between the arm and the arm member.

In addition to one or more of the features described above, or as an alternative to any of the foregoing embodiments, the table deploys on a driver's side of the vehicle and the another table deploys on a passenger side of the vehicle.

In addition to one or more of the features described above, or as an alternative to any of the foregoing embodiments, the apparatus further comprises an anti-pinch mechanism with a sensor that detects an undesired slowing of the movement of the table into the housing.

Also disclosed herein is a method for deploying a table from a housing of a vehicle. The method including the steps of: moving the table via an arm from a first position in a first linear direction; contacting a deviating point with the arm when the table is in a second position and pivoting the table about a first axis when the arm contacts the deviating point so that the table is in a third position; sliding the table with respect to the arm; pivoting the table about an axis such that the table is moved from a vertical position to a horizontal position, the horizontal position being a fourth position; and sliding the table from the fourth position to a fifth position.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1A:
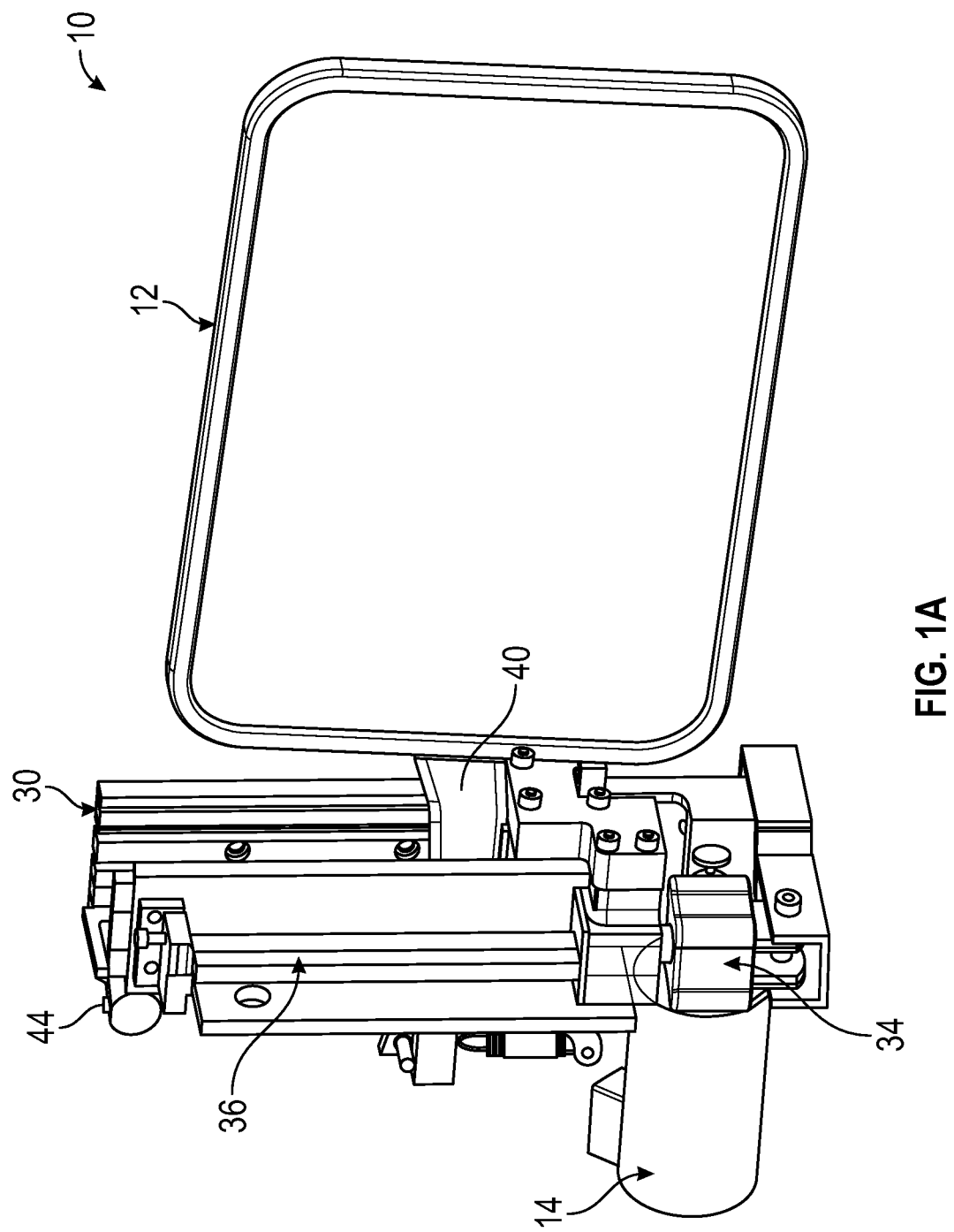
FIG. 1A is a perspective view of a deployable table and an apparatus for deploying the table.
Figure 1B:
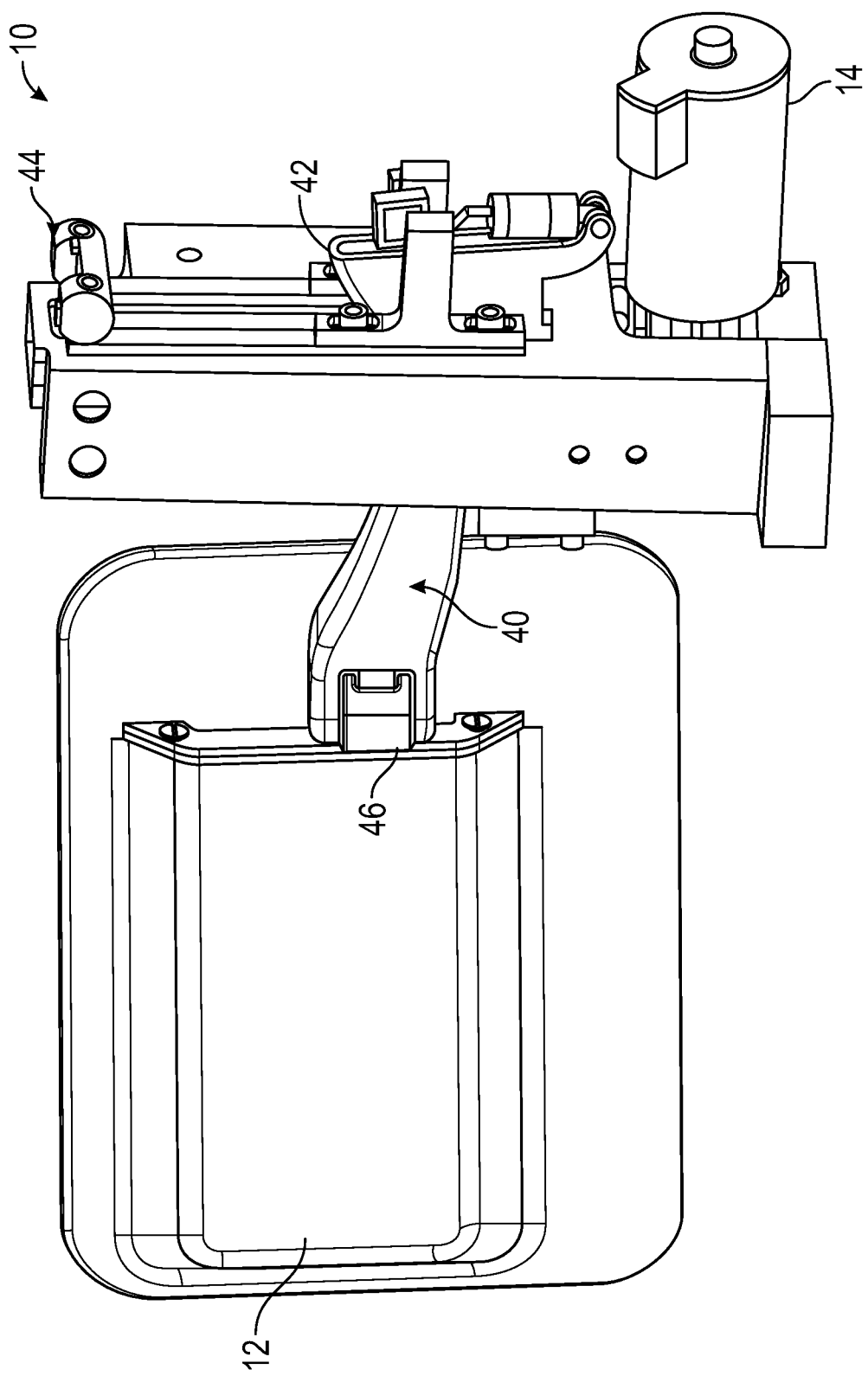
FIG. 1B is another perspective view of the deployable table and the apparatus for deploying the table.
Figure 1C:
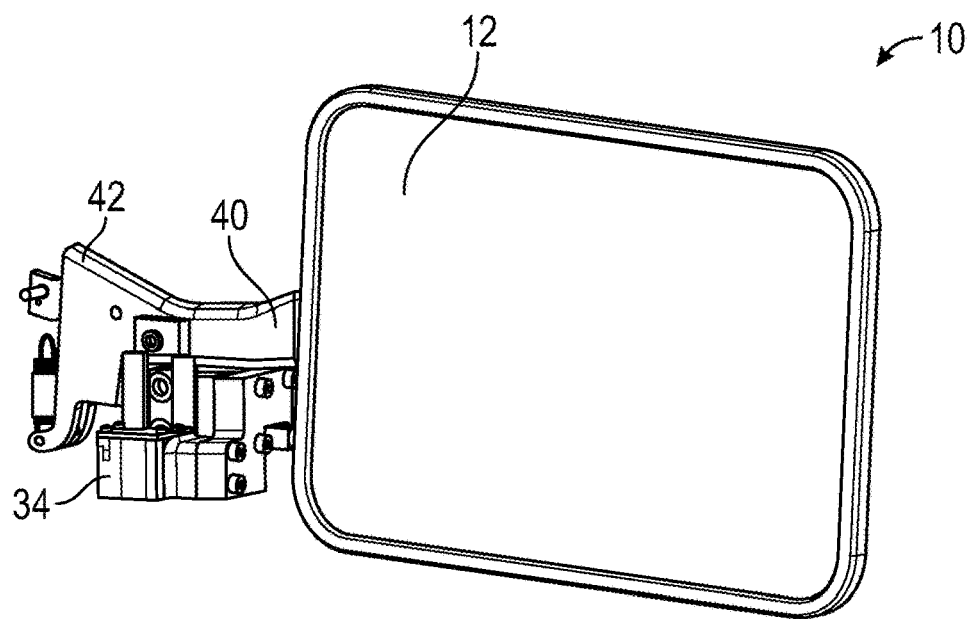
FIG. 1C is a perspective view of components of the apparatus for deploying the table.
Figure 2A:
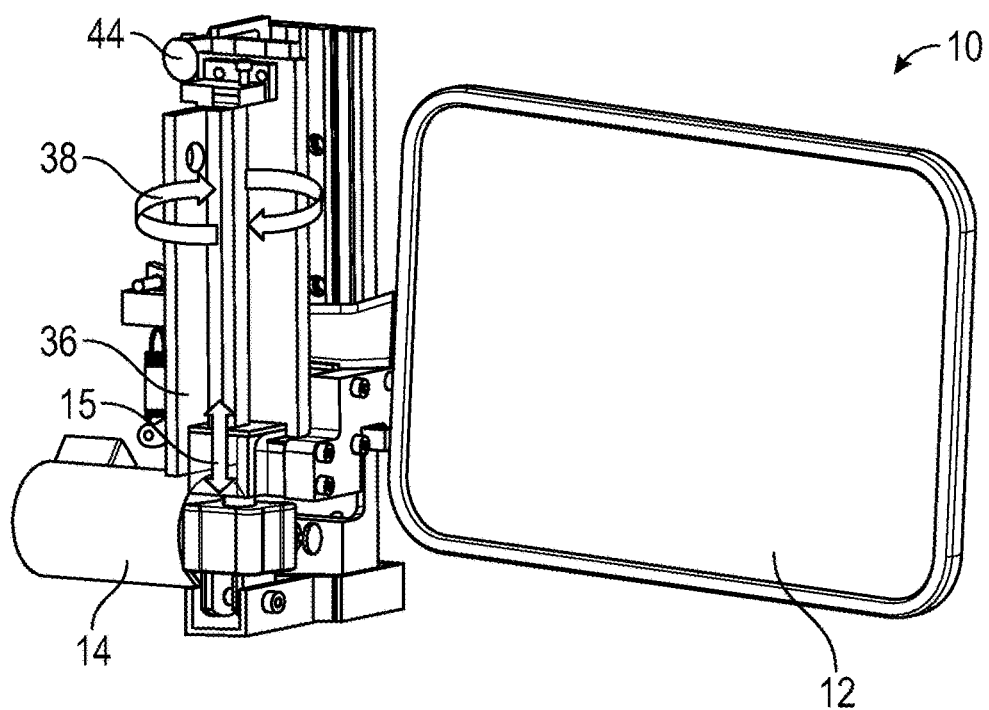
FIGS. 2A and 2B illustrate operation of the apparatus for moving the deployable table from a stowed position.
Figure 2B:
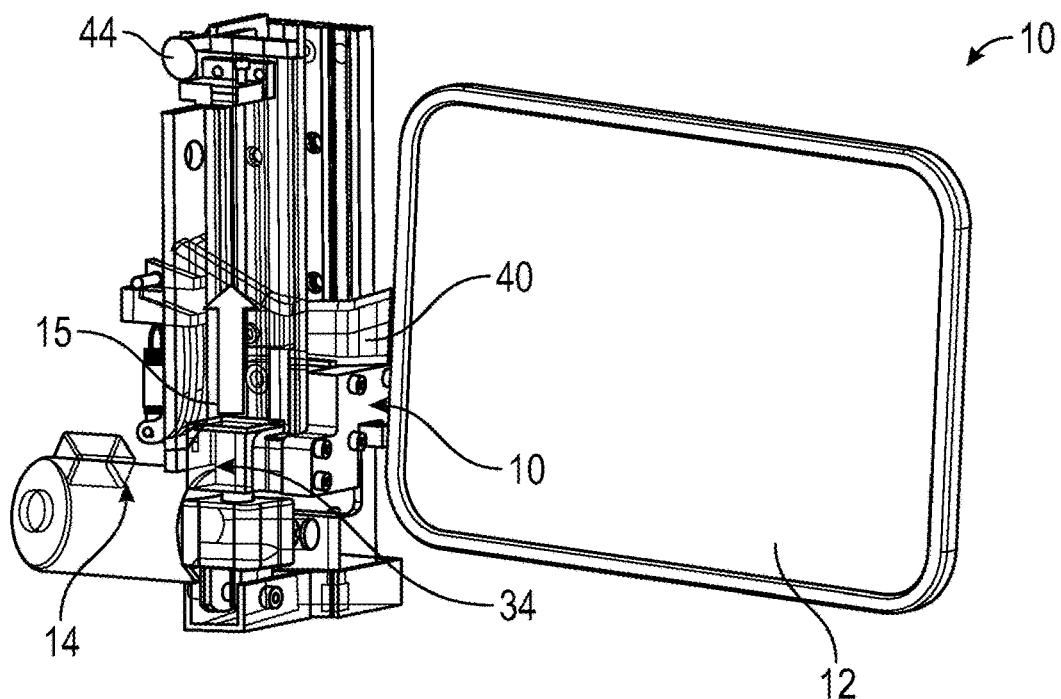
Figure 2C:
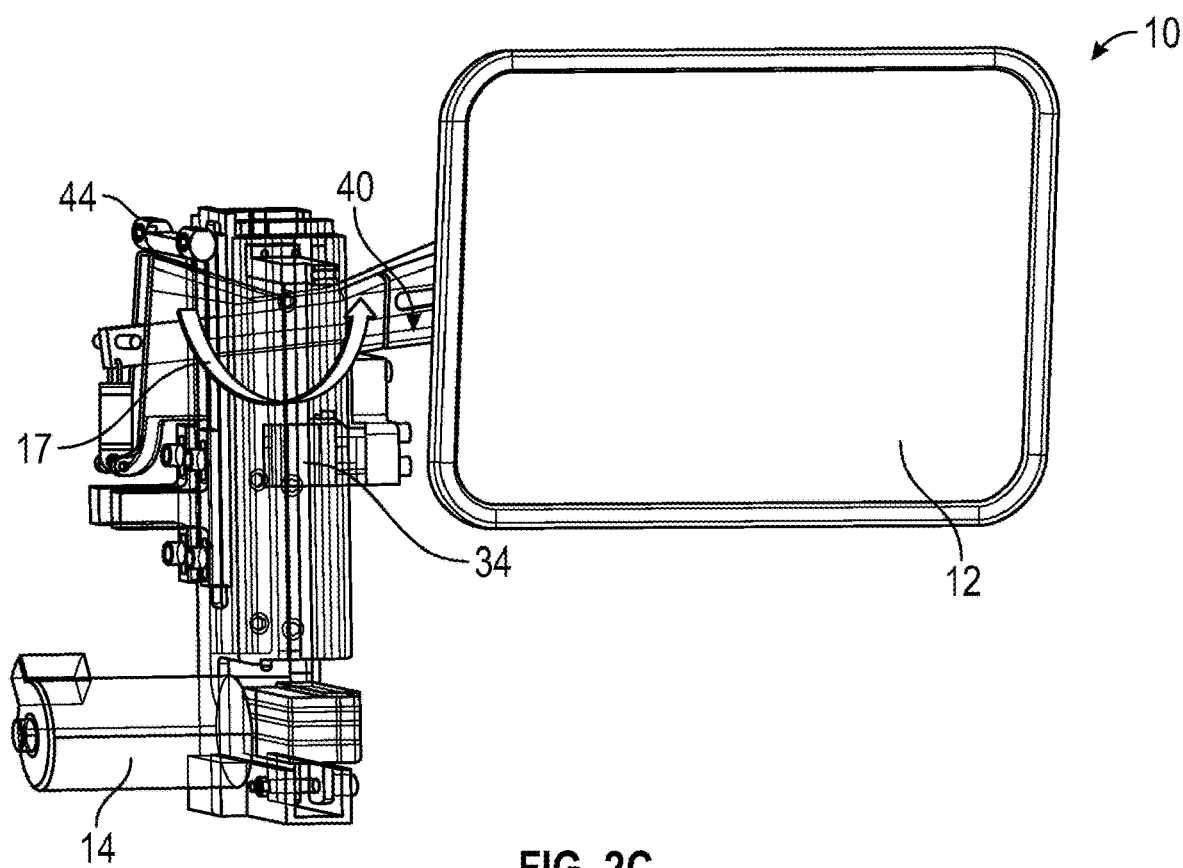
FIG. 2C illustrates operational movement of the apparatus as the table moves towards a deployed position.
Figure 3A:
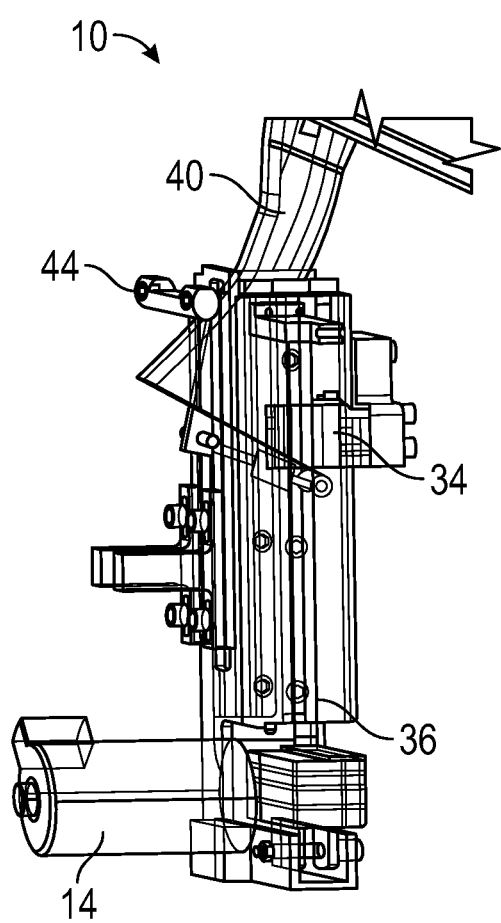
FIGS. 3A-3C illustrate further operational movement of the apparatus as the table moves towards the deployed position.
Figure 3B:
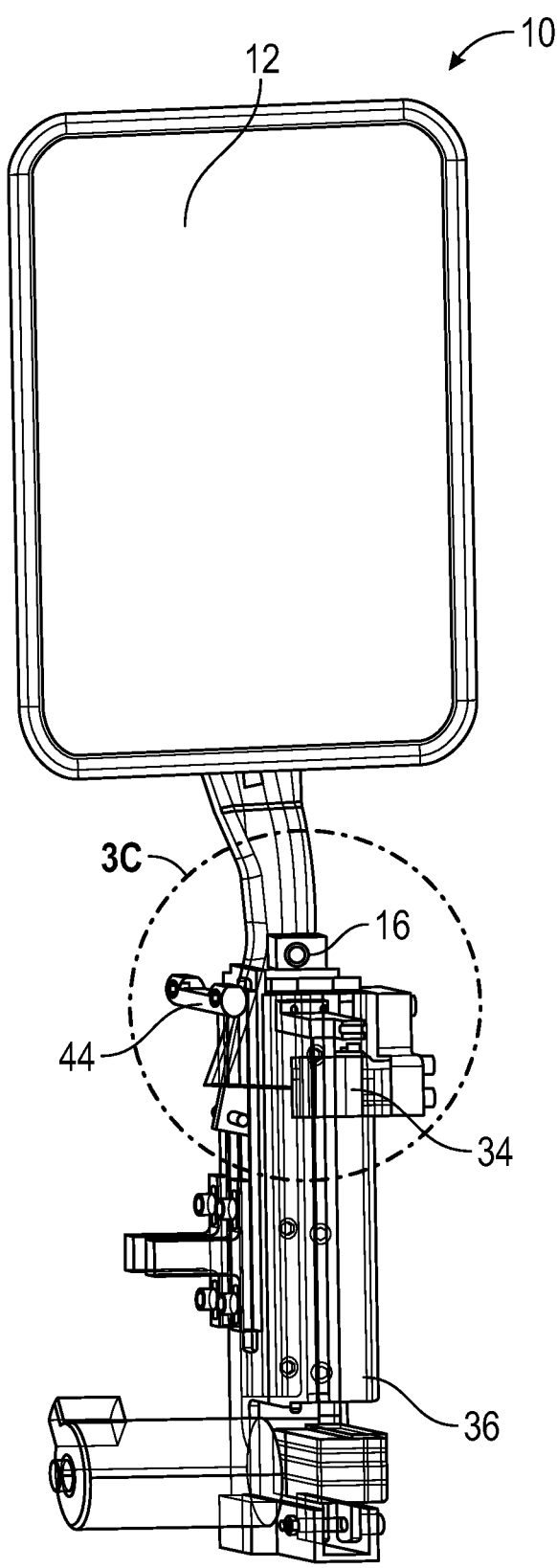
Figure 3C:
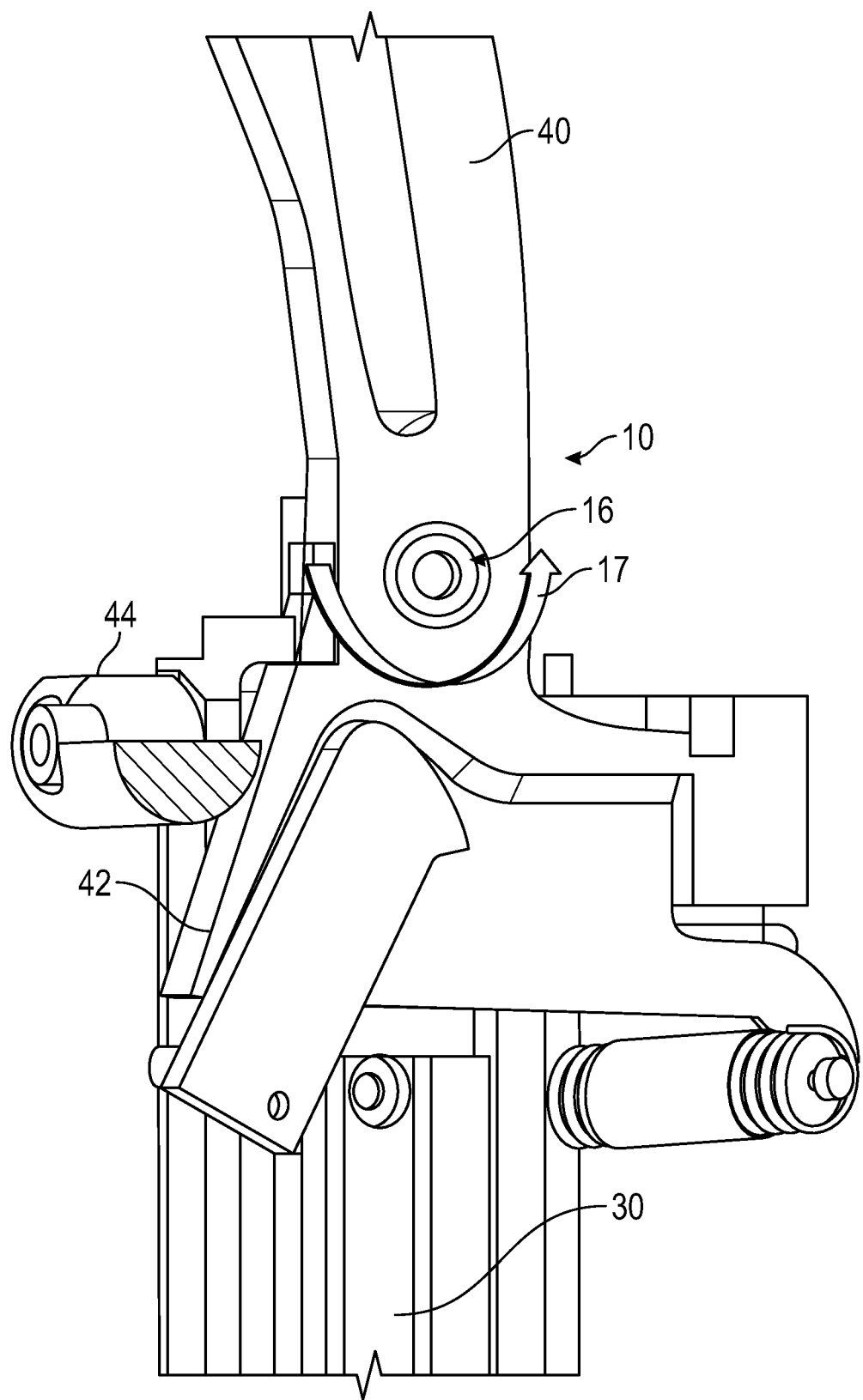
Figure 4:
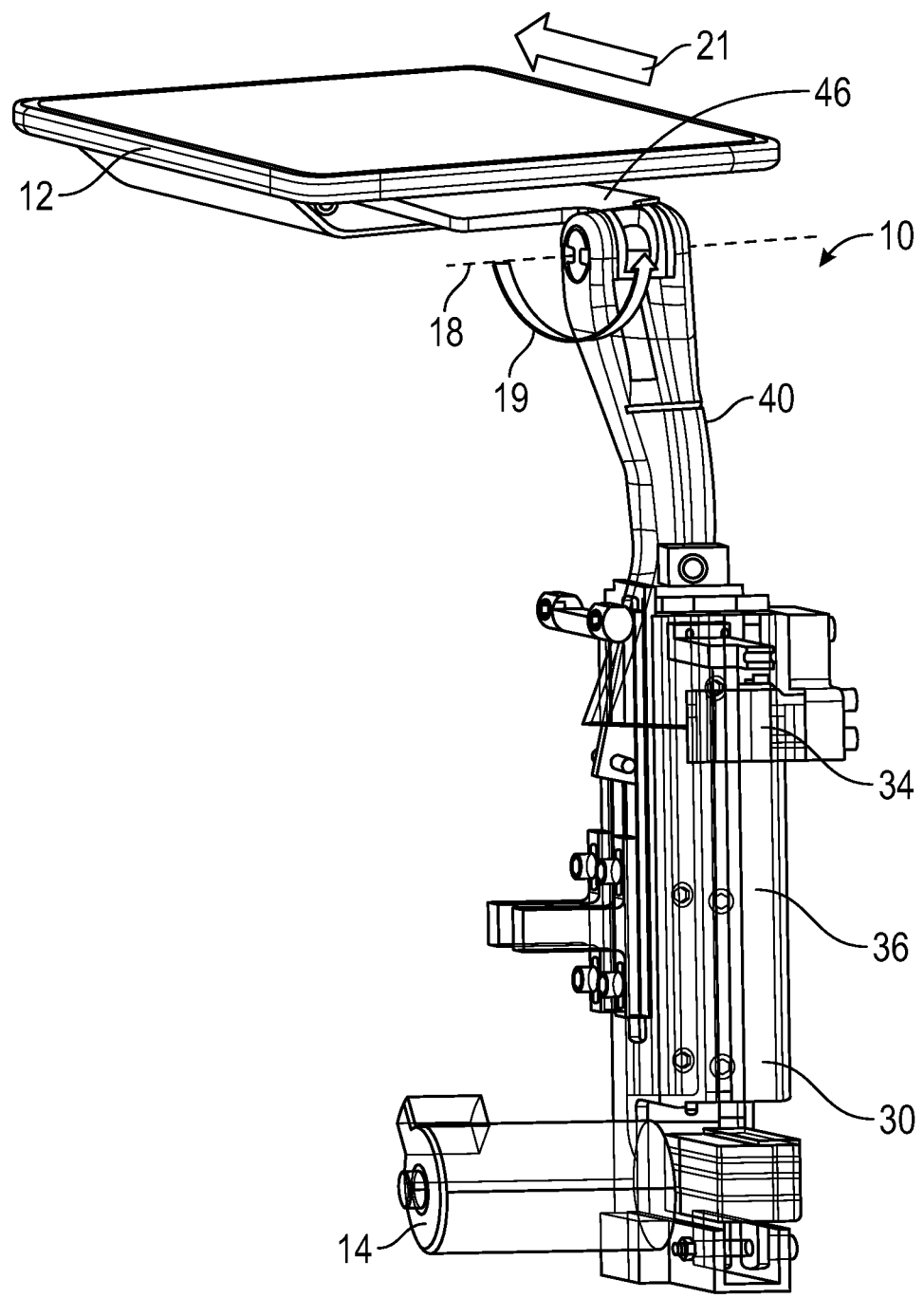
FIG. 4 illustrate the table in the deployed position.
Figure 5A:
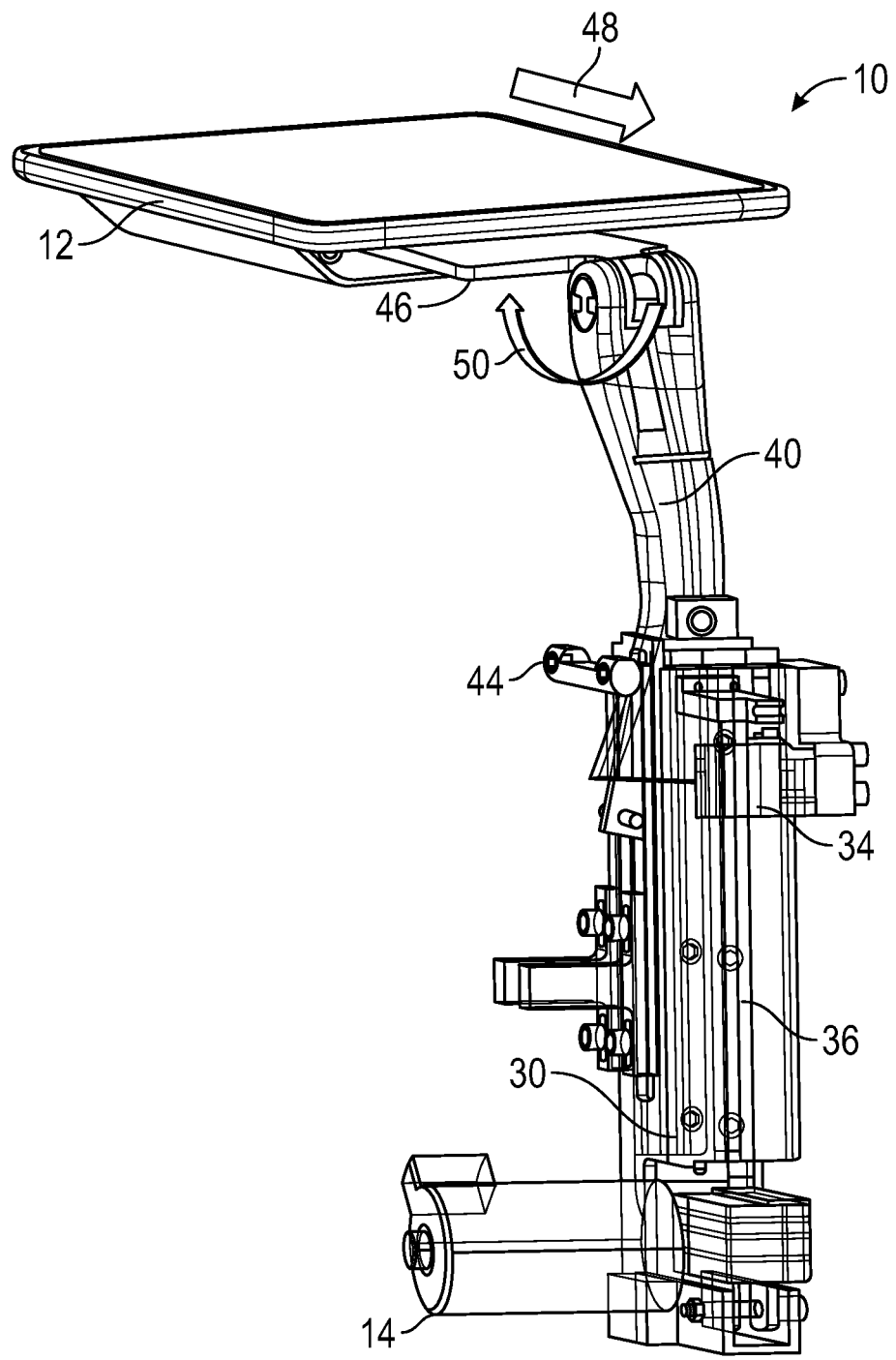
FIGS. 5A-5C illustrate operational movement of the apparatus as the table moves towards the stowed position from the deployed position.
Figure 5B:
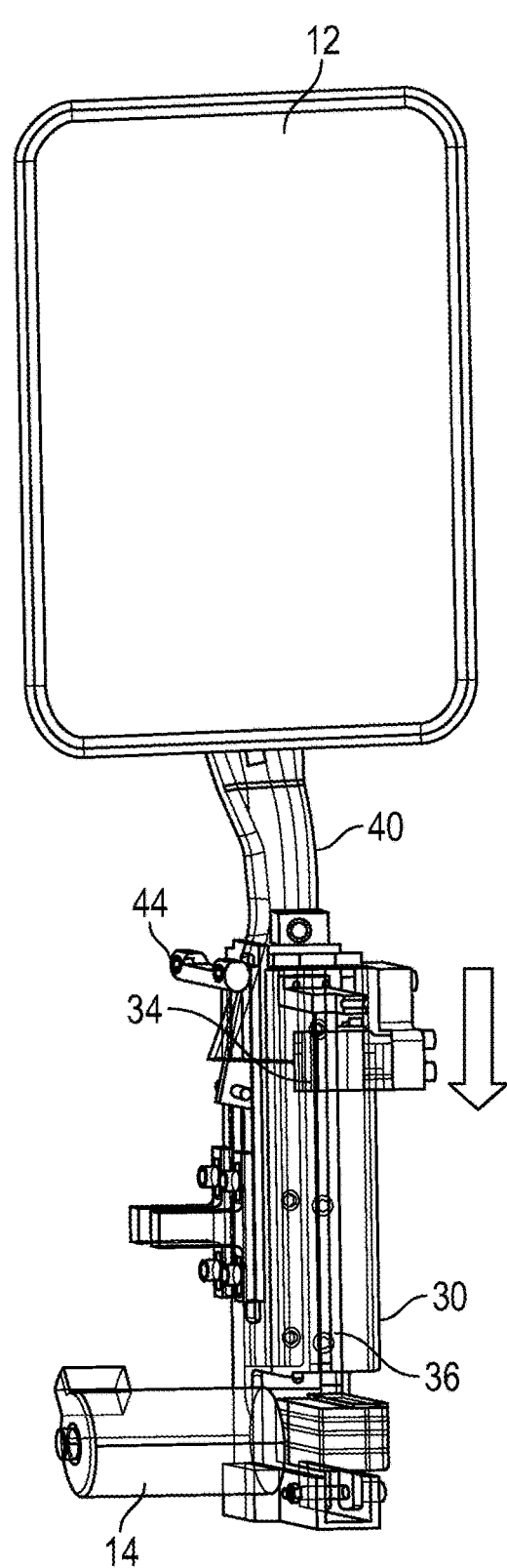
Figure 5C:
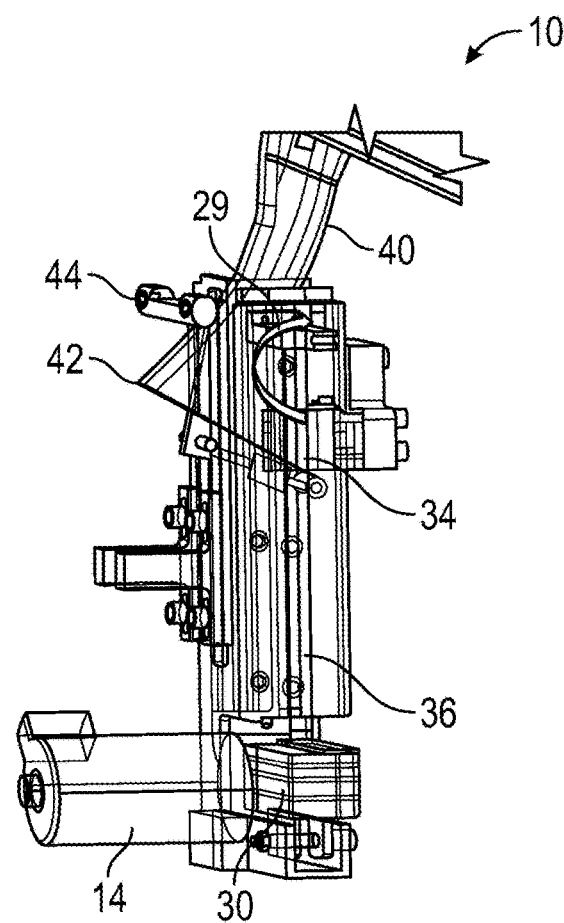
Figure 6A:
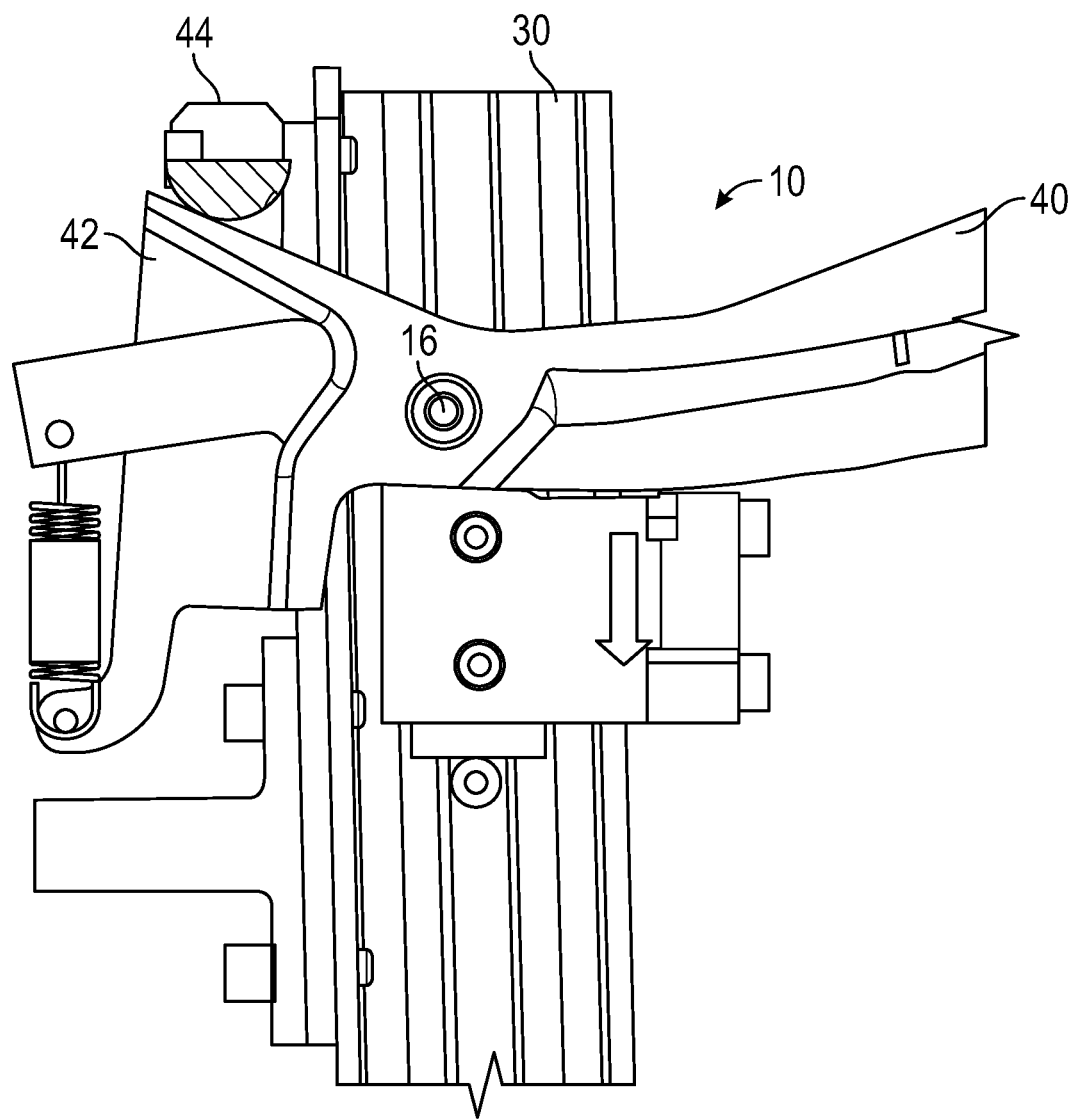
FIGS. 6A-6B illustrate further operational movement of the apparatus as the table moves towards the stowed position from the deployed position.
Figure 6B:
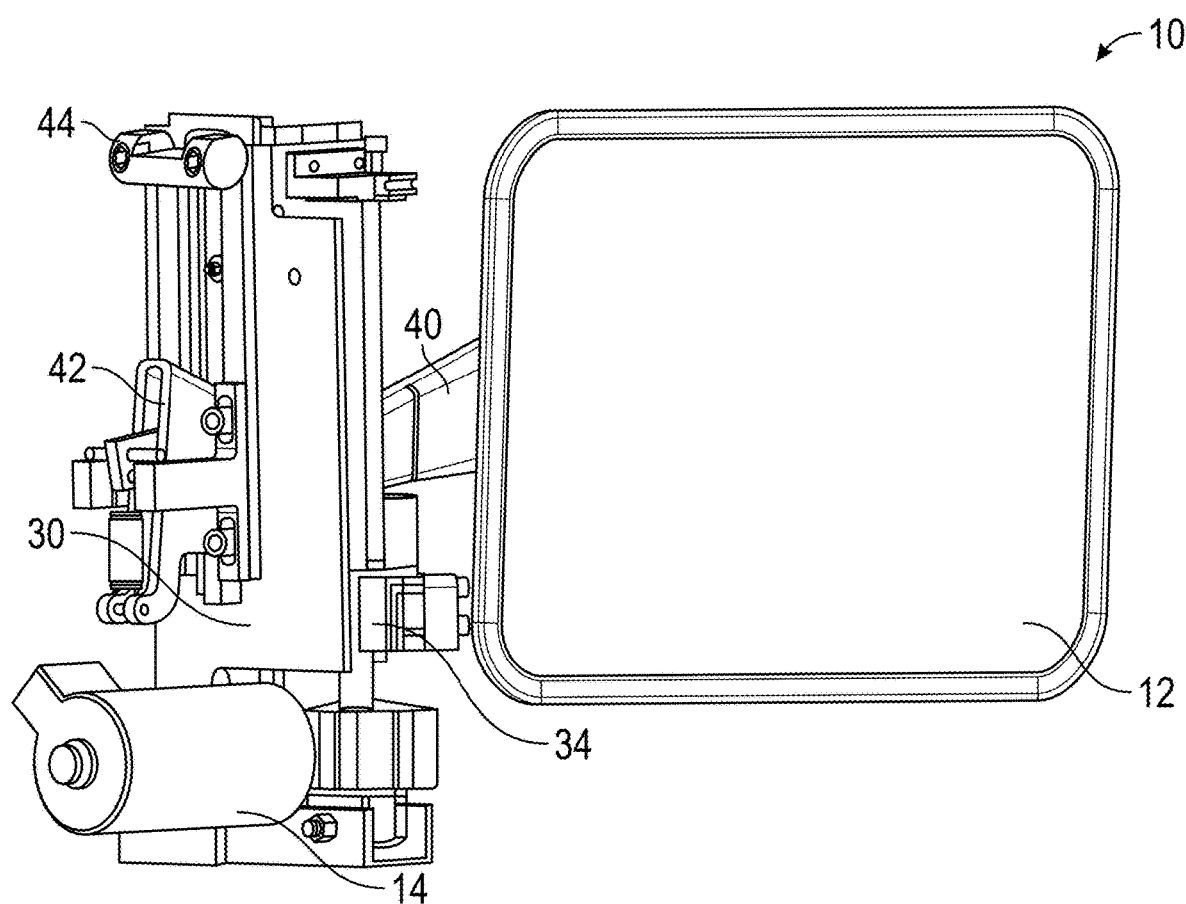
Figure 7:
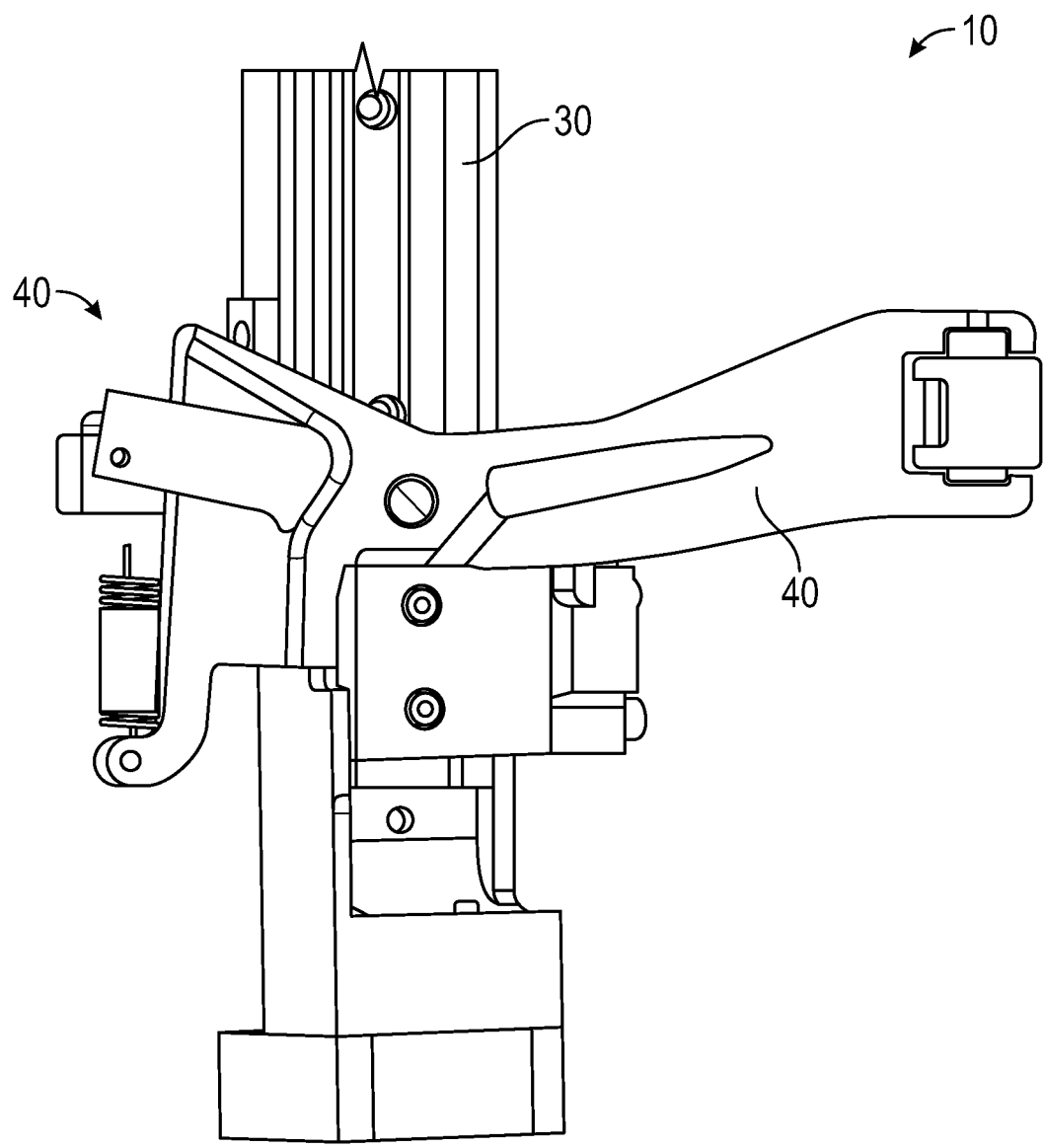
FIG. 7 illustrates a portion of the apparatus when the table is in the stowed position.
Figure 8:
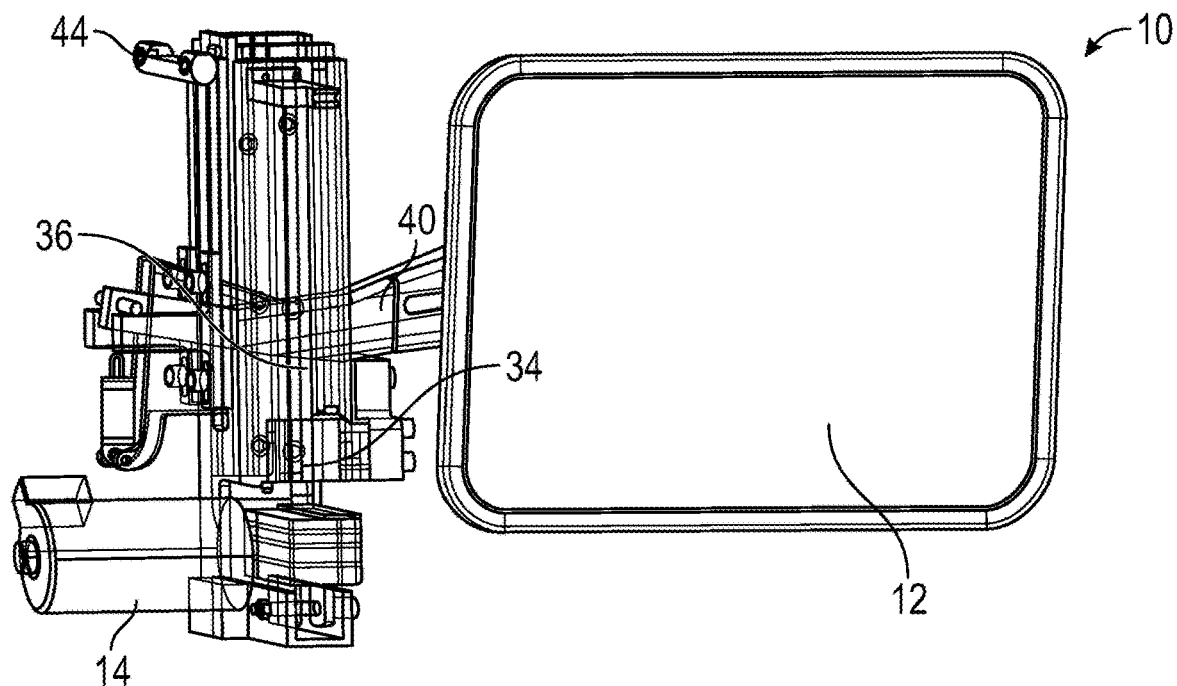
FIG. 8 illustrates the table in the stowed position.

Referring now to the FIGS., an apparatus 10 for deploying a table 12 from a housing 24 is illustrated. In one embodiment, the apparatus 10 deploys the table 12 through actuation of a motor 14 or otherwise (e.g., manual operation) in order to move the table 12 upwardly from its stowed position or first position in a first direction illustrated by arrow 15. In one embodiment, the first direction is a linear direction. The table 12 will move in this direction until it reaches a point or second position (See at least FIG. 2B) where further actuation of the motor 14 or manual operation will cause the table 12 to cease movement in the first direction and cause the table 12 to pivot about an axis 16, which causes movement of the table 12 in the direction of arrow 17 into a third position (see at least FIG. 3B), wherein the table 12 is fully deployed from the housing 24. Thereafter, the table 12 is pivoted about another axis 18 in the direction of arrow 19 to position the table 12 in a generally horizontal position with respect to an occupant of the vehicle. This may be referred to a fourth position. When in this position, the table 12 may be slid in the horizontal direction in the direction of arrow 21 to further locate the table 12 in a desired position. This may be referred to as a fifth position (see at least FIG. 4). This movement is illustrated in at least FIGS. 1A-4.

Referring now to FIGS. 5A-8, movement of the table 12 from the fifth position or fully deployed position to the first or stowed position is illustrated. Here the table 12 is slid from the fifth position to the fourth position. The sliding occurs in a direction opposite to arrow 21. Thereafter, the table 12 is pivoted about axis 18 in a direction opposite to arrow 19 such that the table is now in the third position. At this point, the operator may actuate the motor 14 or manually actuate the table 12 such that the table 12 pivots in a direction opposite to arrow 17 about axis 16 such that the table 12 moves from the third position to the second position.

Once in the second position the table 12 is moved downwardly in a direction opposite to arrow 15 such that the table 12 is moved from the second position to the first position. This movement (fully deployed to stowed) is illustrated in at least FIGS. 5A-8.

Figure 9:
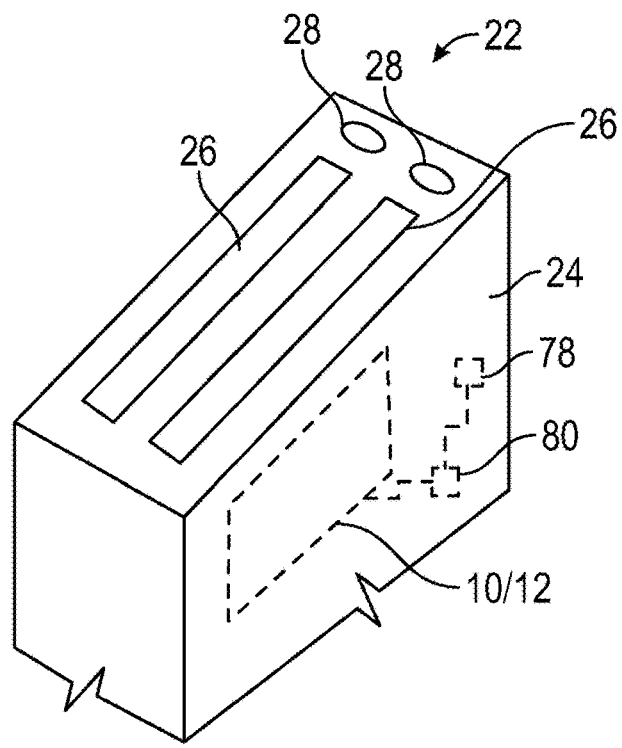
FIG. 9 is a perspective view illustrating a portion of a console for housing the apparatus and deployable table.
Figure 10:
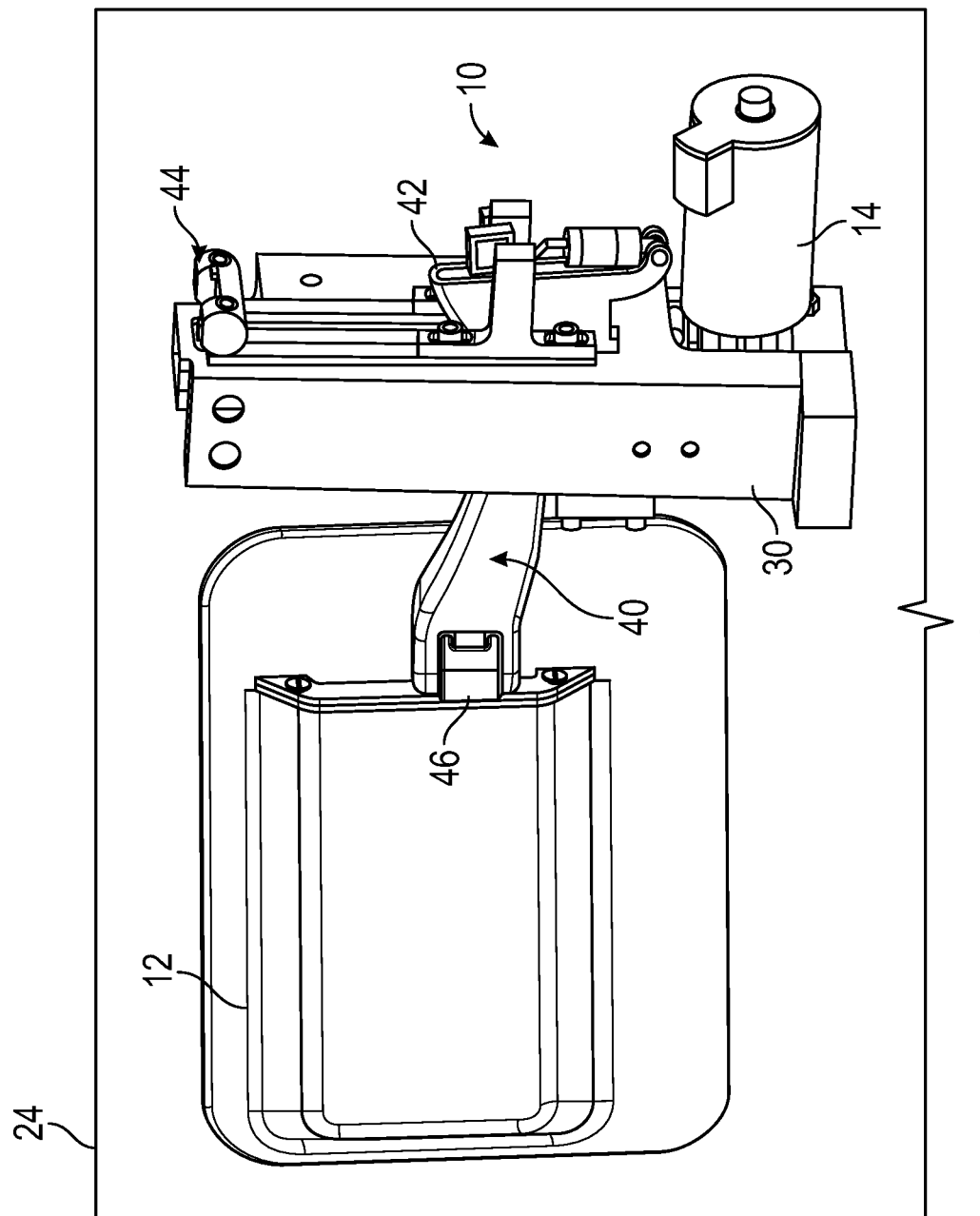
FIG. 10 is schematic view illustrating the apparatus and the deployable in a housing or console.

FIG. 9 is a perspective view of a portion of a vehicle interior 22 having a trim portion or housing 24 that houses the apparatus 10 and table 12 when it is in the stowed position. The housing 24 may have a deployable door 26 that opens when a button 28 operably coupled to the apparatus is actuated. In one non-limiting embodiment, the housing 24 is a center console of a vehicle interior. Still further, the housing or center console 24 may be configured to house two apparatus 10 and tables 12 each one being separable actuated and independently operated. In this embodiment, one apparatus 10 and its table 12 is for the driver's side while the other apparatus 10 and its table 12 is for the passenger side. Of course, numerous other locations and configurations are considered to be within the scope of the present disclosure.

Referring back now to FIGS. 1A-9, the apparatus 10 may further comprise a guiding or rail 30 upon which a sliding element 32 moves up and down in the direction of arrow 15 as well as in a direction opposite to arrow 15. The sliding element 32 is operably coupled to a spindle nut or nut 34 that is meshingly engaged with a spindle 36 that rotates in the direction of arrows 38 when the motor 14 is operated. In one embodiment, the motor 14 has a self-locking worm gear that meshingly engages with the spindle 36. In other words, activation of the motor 14 in one direction causes the spindle 36 to rotate in one direction where the nut 34 moves in the direction of arrow 15. On the other hand, activation of the motor 14 in an opposite direction causes the spindle 36 to rotate in an opposite direction where the nut 34 moves in a direction opposite to arrow 15. This upward and downward movement of the nut 34 will cause deployment and stowing of the table 12.

The apparatus 10 further includes a table arm 40 that is operably coupled to the table 12 at one end and is pivotally secured to the sliding element 32 for movement about axis 16. Thus, table arm 40 pivots or rotates with respect to the sliding element 32. An opposite end 42 of the table arm 40 is positioned to contact a deviating point or member 44 such that as the table 12, table arm 40 and nut 34 move upwardly in the direction of arrow 15, the end 42 of the table arm 40 will contact the deviating point or member 44 such that further movement of the sliding element 32 in the direction of arrow 15 will cause the table to rotate about axis 16 so that the table can transition from the second position into the third position.

Once the nut 34 has reached it full upward movement, the table 12 will be fully rotated into the third position. See at least FIG. 3B. Once in this position, the table 12 is slid away from axis 18 so that the table 12 can be pivoted from the third position to the fourth position. In one embodiment, the rotation of the table 12 about axis 18 may not occur until the table 14 is slid away from the axis 18. This can be attributed to an arm member 46 being pivotally secured to table arm 40 at axis 18. In other words, the arm member 46 is pivotally secured to the table arm 40 and the arm member 46 is slidably secured to the table 12, wherein sliding movement of the table 12 with respect to the arm member 46 allows for pivotal movement of the arm member 46 with respect to the table arm 40. For example, the table 12 when in the third position is located on opposite sides of the axis 18 so that arm member 46 cannot pivot with respect to the table arm 40 unless the table is slid away from the axis 18.

Once the table 14 is in the fourth position, the table 14 can be slid further in the direction of arrow 21 into the fifth position.

In order to stow the table 14, operation is generally the opposite. For example and referring now to FIGS. 5A-8, the table is slid from the fifth position in the direction of arrow 48 so that the table can be located in the fourth position and pivoted in the direction of arrow 50 about axis 18 so the that the table can be moved into the third position. As mentioned above, pivotal movement of the table 12 about axis 18 may depend on the slidable location of the table 12 with respect to the table arm 40 and the arm member 46.

Once in the third position, an operator activates the apparatus 10 via operation of button 28. Once actuated, motor 14 spins spindle 36 such that nut 34 moves in the direction opposite to arrow 15 (e.g., downward). As the nut 34 moves downward, a spring loaded lever 52 rotates the table arm 40 about axis 16 once the opposite end 42 of the table arm 40 is allowed to move with respect to the deviating point or member 44 as nut 34 moved downward.

As the table rotates from the third position to the second positon, further movement of the nut 34 downward will cause downward movement of the table in a direction opposite to arrow 15 such that the table 12 can be stowed into trim portion or housing 24. Thereafter, deployable door 26 if applicable will close.

Figure 11:
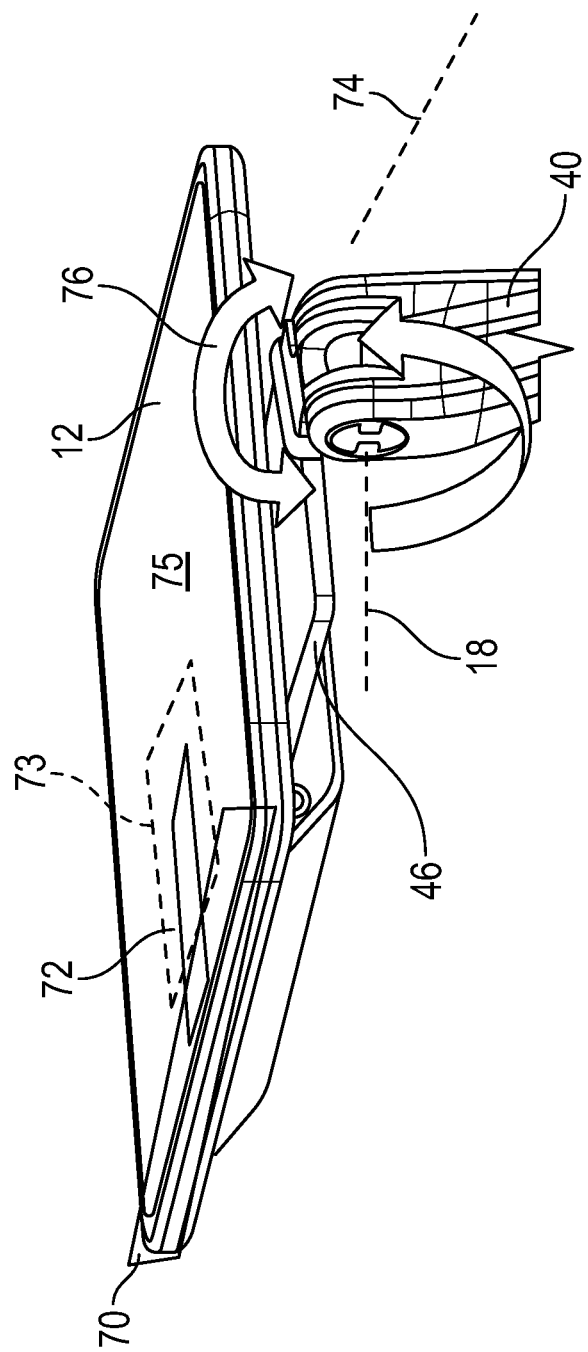
FIG. 11 is a perspective view of an alternative embodiment of the present disclosure.

Referring now to FIG. 11, an alternative embodiment of the present disclosure is provided. Here the table may be provided with a lip 70 that may be foldably secured to the table 12 such that the lip 70 can be deployed to a deployed position from a stowed positon. The lip 70 may prevent objects 72 such as cell phones, keys, tablets etc. from sliding off of the table when it is in the fifth position. In one embodiment, the foldable lip 70 may be disposed on one edge of the table 12 or all edges of the table 12 or some or portions of some of the edges of the table 12. In another embodiment or in combination with the above features, the table may also be adjustable about axis 74 or in the directions of arrows 76. In other embodiments, the table 12 may be adjustable by the occupant or user in different angles than those illustrated by arrows 76. Moreover and in yet another embodiment, the angle of the table may be set in a stable manner through a mechanism that will lock the table's adjusted position or angle or orientation. Alternatively, pivoting links around axis 18 and 74 can be replaced by a single ball-joint with angle orientation limitations and drag allowing smooth adjustment of the table 12. This embodiment may also include the aforementioned locking feature for stabilizing the table 12 in the desired position.

In yet another embodiment, the table 12 may be powered so that it can provide additional functionalities including but not limited to: wireless charging or pairing of an electronic portable (e.g. induction charging, NFC pairing with other vehicle entertainment or control systems) device over a location marked 73 on table 12, which can be identified by printing or any other recognition manner by the user, optionally activatable via a button or touch button, for example on the table 12 or console 24. Of course, other locations other than those illustrated in FIG. 11 are contemplated.

In yet another embodiment, the surface 75 of the table 12 may be an activatable touchscreen or the table 12 is a tablet. As such, the table 12 can be used directly like a tablet, or as a keyboard/sketchboard if connected to a system using a separate screen available in the vehicle.

In another embodiment, the apparatus may be equipped with an anti-pinch mechanism such that as the table is moved into the housing 24 (second position to first position) any object (e.g., a user's fingers) caught between the table 12 and the housing opening 26 may slow operation of the spindle 36 and/or motor 14. In order prevent injury a sensor 78 is provided that is operably coupled to a controller 80 that shuts down or reverses operation of the motor 14 should the sensor 78 detect an undesired slowing of the movement of the table 14 into the housing 24.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An apparatus for deploying a table from a housing, the apparatus comprising:
   an arm pivotally securing the table to the apparatus wherein the apparatus via the arm moves the table from a first position in a first linear direction;

a deviating point that contacts the arm and pivots the table about a first axis when the arm contacts the deviating point;

an arm member slidably secured to the table at one end and pivotally secured to the arm at another end, the arm member being pivotally secured to the arm and pivotal movement of the table and the arm member with respect to the arm is prevented when the table extends over a pivot axis between the arm and the arm member;

a motor for moving the table via the arm;

a spindle operably coupled to the motor and a nut rotatably secured to the spindle such that rotation of the spindle causes linear movement of the nut; and a rail slidably receiving a sliding element, the arm being pivotally secured to the sliding element and the sliding element being operably coupled to the nut.

2. The apparatus as in claim 1, wherein the table further comprises a foldable lip.

3. The apparatus as in claim 1, wherein the table is pivotally secured to the arm member for movement about another axis, the another axis being different from the pivot axis.

4. The apparatus as in claim 1, wherein the table and the arm member are pivotally secured to the arm for movement about another axis, the another axis being different from the pivot axis.

5. An interior trim of a vehicle, comprising:

a housing; and an apparatus for deploying a table from the housing, the apparatus comprising:

an arm pivotally securing the table to the apparatus wherein the apparatus via the arm moves the table from a first position in a first linear direction;

a deviating point that contacts the arm and pivots the table about a first axis when the arm contacts the deviating point; and an arm member slidably secured to the table at one end and pivotally secured to the arm at another end, wherein the arm member is pivotally secured to the arm and wherein pivotal movement of the table and the arm member with respect to the arm is prevented when the table extends over a pivot axis between the arm and the arm member;

a motor for moving the table via the arm;

a spindle operably coupled to the motor and a nut rotatably secured to the spindle such that rotation of the spindle causes linear movement of the nut; and a rail slidably receiving a sliding element, the arm being pivotally secured to the sliding element and the sliding element being operably coupled to the nut.

6. The interior trim as in claim 5, wherein the table further comprises a foldable lip.

7. The interior trim as in claim 5, wherein the table is pivotally secured to the arm member for movement about another axis, the another axis being different from the pivot axis.

8. The interior trim as in claim 5, wherein the table and the arm member are pivotally secured to the arm for movement about another axis, the another axis being different from the pivot axis.

9. The interior trim as in claim 5, wherein the housing has a deployable door that opens when a button operably coupled to the apparatus is actuated.

10. The interior trim as in claim 5, wherein the housing is a center console of the vehicle.

11. The interior trim as in claim 10, wherein the center console encloses another apparatus for deploying another table from the center console, the another apparatus comprising:

an arm pivotally securing the another table to the another apparatus wherein the apparatus via the arm moves the another table from a first position in a first linear direction;

a deviating point that contacts the arm and pivots the another table about a first axis when the arm contacts the deviating point; and an arm member slidably secured to the another table at one end and pivotally secured to the arm at another end, wherein the arm member is pivotally secured to the arm and wherein pivotal movement of the another table and the arm member with respect to the arm is prevented when the another table extends over a pivot axis between the arm and the arm member;

a motor for moving the another table via the arm;

a spindle operably coupled to the motor and a nut rotatably secured to the spindle such that rotation of the spindle causes linear movement of the nut;

a rail slidably receiving a sliding element, the arm being pivotally secured to the sliding element and the sliding element being operably coupled to the nut.

12. The interior trim as in claim 11, wherein the table deploys on a driver's side of the vehicle and the another table deploys on a passenger side of the vehicle.

13. The interior trim as in claim 5, wherein the apparatus further comprises an anti-pinch mechanism with a sensor that detects an undesired slowing of the movement of the table into the housing.

14. A method for deploying a table from a housing of a vehicle, the method comprising:

moving the table via an arm from a first position in a first linear direction, the arm being pivotally secured to a sliding element slidably received on a rail, the sliding element being operably coupled to a nut rotatably secured to a spindle operably coupled to a motor such that rotation of the spindle causes linear movement of the nut;

contacting a deviating point with the arm when the table is in a second position and pivoting the table about a first axis when the arm contacts the deviating point so that the table is in a third position;

sliding the table with respect to the arm;

pivoting the table about an axis such that the table is moved from a vertical position to a horizontal position, the horizontal position being a fourth position; and sliding the table from the fourth position to a fifth position.

* * * * *